United States Patent [19]
Watanabe et al.

[11] 4,216,020
[45] Aug. 5, 1980

[54] CARBONACEOUS BRICKS AND THE METHOD FOR PRODUCING THE SAME

[75] Inventors: Akira Watanabe; Tetsuya Sugimoto, both of Okayama; Yukio Kusaka; Noboru Shinoda, both of Bizen; Takanori Shimizu, Okayama, all of Japan

[73] Assignee: Kyusyu Refractories Co., Ltd., Japan

[21] Appl. No.: 13,478

[22] Filed: Feb. 21, 1979

[30] Foreign Application Priority Data

Aug. 26, 1978 [JP] Japan .................. 53-104292

[51] Int. Cl.$^2$ .............................................. C04B 35/52
[52] U.S. Cl. ..................................................... 106/56
[58] Field of Search ........................................ 106/56

[56] References Cited
U.S. PATENT DOCUMENTS 2,799,052  7/1957  Stroup ................................. 106/56
3,969,124  7/1976  Stewart .............................. 106/56

Primary Examiner—James Poer
Attorney, Agent, or Firm—Wenderoth, Lind & Ponack

[57] ABSTRACT

The invention relates to carbonaceous bricks having resistance to fire and corrosion, capable of withstanding mechanical impact to which the conventional carbonaceous bricks were vulnerable, and usable in an oxidizing atmosphere, and the method as producing the same. The invention has for an object to obtain carbonaceous bricks having said high properties by mixing less than 60 weight % of inorganic material with 40~100 weight % of pellets consisting of carbonaceous material containing substantially more than 70 weight % of carbon and a bonding agent comprising pulverized phenol resin, liquid thermosetting resin and/or setting accelerator, bricks formed therefrom containing more than 40 weight % of carbon.

4 Claims, No Drawings

CARBONACEOUS BRICKS AND THE METHOD FOR PRODUCING THE SAME

The invention relates to carbonaceous bricks made of pellets of carbonaceous material containing substantially more than 70 weight % of carbon, and a method for producing the same.

The so-called carbonaceous bricks comprising carbon as the principal ingredient have an advantage in that they have a high resistance to fire, thermal impact and corrosion, and are less susceptible to changes at high temperatures compared with other refractories, since they contain a large amount of carbonaceous powders and a small amount of inorganic refractory materials usually for use as aggregate in ordinary refractories. On the other hand, they have a disadvantage in that they are expensive in respect of production cost, vulnerable to mechanical impacts and unsuitable for use in an oxidizing atmosphere.

The conventional carbonaceous bricks were usually produced by the following method. In the case where coke having a great mechanical strength despite its high porosity was used as a carbonaceous material, inorganic refractory material and carbonaceous powders with coke as aggregate were warm-kneaded by adding tar or the like as a bonding agent. The mixture thus obtained was pressed and baked at a high temperature in a reducing atmosphere, and then impregnated with tar again for further baking. The conventional bricks were usually produced by repeating the said procedure. Thus, the conventional carbonaceous bricks had a disadvantage in that they were expensive since the production necessitated many steps and much time.

In case of use of a carbonaceous material having a low porosity, such as scaly graphite and the like, most of the scales when pressed were aligned at right angles to the direction of pressure, lamination being produced as a result. The bricks thus obtained had a disadvantage in that the strength and corrosion resistance thereof greatly varied according to the direction.

With an object to offset the aforementioned disadvantage, bricks were impregnated or coated with thermosetting resin. However, it was difficult to obtain sufficiently reinforced carbonaceous bricks by the conventional methods. Furthermore, a bonding agent, such as tar, pitch and the like, was used individually in order to improve the plasticity. The bricks molded by use of such bonding agent were softened in the course of processing or operation. As a result, the amount of the bonding agent to be added was severely restricted thereby rendering it very difficult to achieve the expected results.

The present invention has as an object to provide carbonaceous bricks producible at low cost and suitable for general use by improving the production method thereby enabling one to eliminate the above-mentioned disadvantages whilst retaining the properties, such as high resistance to heat, thermal impact and corrosion.

To be more precise, the invention relates to carbonaceous bricks containing 40~100 weight % of pellets consisting of carbonaceous material containing substantially more than 70 weight % of carbon and a bonding agent comprising pulverised phenol resin, liquid thermosetting resin and/or setting accelerator, the ultimate product containing more than 40 weight % of carbon, and also to the method for producing the same.

The invention will now be described in more detail. The carbonaceous material for use in the invention is an independent carbon source material or a mixture therewith of an inorganic refractory material except said carbon source material and containing substantially more than 70 weight % of carbon. The carbon source material comprises natural graphite, synthetic graphite, waste electrode, petroleum coke, foundry coke, carbon black, etc. Natural graphite, synthetic graphite and petroleum coke are particularly preferable.

The inorganic refractory material comprises general basic, neutral or acid oxides, such as magnesia, chrome, dolomite, alumina, silica, zircon, etc., carbides, such as silicon carbide, titanium carbide, etc., nitrides, such as silicon nitride, boron nitride, etc., as well as the aforementioned carbon source materials.

When the carbonaceous material comprises a mixture of carbon source material and inorganic refractory material, the most effective mixing ratio is within the range of 70~100 weight % for the former and 0~30 weight % for the latter. If more than 30 weight % of inorganic refractory material is added, that is, if carbon source material is less than 70 weight %, the slug infiltration preventing property and high fire resistance of the carbonaceous material are lost. It is preferable, therefore, to restrict the added amount to the aforesaid range according to the kind of inorganic refractory material and the furnace to be used.

The bonding agent suitable for the achievement of the object of the invention comprises a combination of pulverized phenol resin and liquid thermosetting resin or a mixture of pulverized phenol resin, liquid thermosetting resin and setting accelerator (material capable of accelerating the setting of thermoplastic resin almost without heating).

The pulverized phenol resin comprises novolak type pulverized phenol resin and resol type pulverized phenol resin, of which the former is preferable. The amount of addition thereof is 1~20 weight %, and preferably 2~10 weight %, relative to carbonaceous material or carbonaceous material plus inorganic refractory material. If less than 1 weight %, diffusion of pulverized phenol resin in the pellets as well as that of pulverized phenol resin between the pellets is reduced thereby rendering it impossible to ensure the bonding not only between the carbonaceous materials but also between the pellets. Thus, it is impossible to obtain carbonaceous bricks having high density, great mechanical strength and high corrosion resistance. If more than 20 weight %, the bricks are softened and deformed in the course of the heat treatment.

The liquid thermosetting resin comprises phenol, urea, melamine, epoxy and furane. Particularly suitable are liquid phenol resin, cresol resin, liquid furane resin and the like which have a high ratio of carburetion. The amount of use of this resin is 5~40 weight %, and preferably 7~30 weight %, relative to the carbonaceous material. If less than 5 weight %, the pellets lose strength whereby the strength of the produced bricks is reduced. If more than 40 weight %, pores in the produced bricks are increased due to increased of volatile matter as well as hardening and polymerization of resin. Moreover, the corrosion resistance is undesirably deteriorated.

The setting accelerator is necessitated in order to accelerate the setting of the thermosetting resin which is slow in progress at room temperature or at a temperature in the vicinity thereof and requires a heat treatment for a long period of time. The setting accelerator comprises organic acids, such as paratoluensulfonic acid, benzosulfonic acid and the like, inorganic acids, such as hydrochloric acid, sulfuric acid, nitric acid and the like, calcium hydroxide and magnesium oxide and preferably calcium hydroxide, magnesium oxide and paratoluensulfonic acid, of which magnesium oxide is particularly preferable. When they are pulverized, the granular diameter is preferably less than 0.125 mm. The added amount of the setting accelerator may be determined from considerations of operational efficiency and economy according to the kind thereof.

The ingredients comprising carbonaceous material and bonding agent are mixed by a suitable means, for example, a kneader, and granulated by means of a granulator, pelletizer, vacuum extruder, tablet stamp or the like. The pellets thus obtained are treated into a semi-hardened state at a temperature between room temperature and 100° C. The semi-hardened state is a state in which thermosetting resin in the pellets has not yet been completely set but still retains the properties of resin. To be more precise, the semi-hardened pellets are bonded together under the brick-forming pressure, whilst setting inside each pellet as well as setting of thermosetting resin between each pellet makes steady progress due to said heat treatment or the addition of setting accelerator or a combination thereof, thereby enabling one to obtain solid intercarbonic bonding.

If setting is too quickly progress prior to brick forming, bonding between the pellets is deteriorated thereby rendering it impossible to impart sufficient strength to the heat-treated bricks. Adversely, in case of insufficient setting, the pellets are too soft, as a result of which lamination arises or pellets adhere to the metal mold in the course of pressing. Since the pellets are thus incapable of retaining the shape thereof, granulation is rendered meaningless. It is preferable, therefore, in respect of economy as well as operational efficiency, to apply a heat treatment without using setting accelerator at temperatures between 50° C. and 80° C., setting accelerator being used at room temperature or a temperature in the vicinity thereof thereby enabling one to retain the pellets in a semi-hardened state.

Subsequently, the semi-hardened pellets are granularly adjusted and kneaded independently or, if necessary, by adding inorganic refractory material and carbon source material. The mixing ratio of the pellets, inorganic refractory material and carbon source material is determined in accordance with the amount of carbon in the pellets, for example, 40~100 weight %, and more preferably 55~100 weight %, for the pellets, whilst more than 40 weight %, and more preferably more than 50 weight %, for the amount of carbon in the finished bricks.

If the amount of pellets is less than 40 weight %, diffusion of the pellets in the mixture is not sufficient to ensure their mutual bonding thereby rendering it difficult for the finished bricks to have sufficient strength. If the amount of carbon in the bricks is less than 40 weight %, the finished bricks are undesirably deprived of the properties of carbon, such as prevention of slug infiltration, high refractoriness and the like.

The mixture is further kneaded and pressed, and the pressed bodies thus obtained are subjected to a heat treatment. The temperature is generally between 200° C. and 500° C., though variable according to the resins employed and the combinations thereof. Though a reducing atmosphere or inactive atmosphere is preferable, an oxidizing atmosphere may be used at a temperature below 300° C. By the heat treatment within the said temperature range, the pulverized phenol resin in the pressed bodies is melted and uniformly diffused throughout the construction, whilst the volatile matter in the bonding agent is mostly volatilized thereby enabling one to obtain a complete intercarbonic bonding.

Thus, the method according to the invention enables one to eliminate the disadvantages of the conventional carbonaceous bricks, that is, frequent increase of lamination, poor physical properties, insufficient mechanical strength, unsatisfactory corrosion resistance, and the like.

Furthermore, the carbonaceous bricks according to the invention may be fitted with metal on their surfaces. If at least two out of the four longitudinal surfaces of each carbonaceous brick are fitted with metal, metals of the adjacent carbonaceous bricks are fused and sintered synchronously with graphitization thereof at high temperatures, as a result of which solid furnace walls are formed thereby enabling one to preclude the brick falling phenomenon. Moreover, slug and molten steel adhere to the brick surfaces with the edges of the metal cases thereon as media, covering layers being thus produced thereby enabling one to simultaneously prevent oxidization of carbon.

The invention will now be described in more detail with reference to the following examples.

EXAMPLE 1

6 parts of pulverized phenol resin was added to 100 parts of natural graphite comprising 60 parts of graphite 5~0.5 mm in granular diameter and 40 parts of graphite less than 0.125 mm in granular diameter respectively, and mixed by a kneader for 10 minutes. The mixture, after adding 15 parts of liquid phenol resin thereto, was kneaded for 20 minutes at room temperature and then granulated by a pelleter into pellets 3 mm in diameter. The pellets thus obtained were subjected to a heat treatment at 60° C. for 20 hours.

After cooling, 100% of the pellets were pressed into bricks by a 300 $ friction press. The bricks thus formed were subjected to a heat treatment in a baking furnace at 300° C. for 4 hours.

Table 1 shows the physical properties of the bricks thus obtained and those of the bricks heat-treated at 300° C. and then further treated at 1000° C. for 3 hours in a reducing atmosphere.

Table 1

|  | Treated at 300° C. | Treated at 300° C. and then at 1000° C. |
| --- | --- | --- |
| Apparent Specific Gravity | 1.92 | 2.03 |
| Bulk Specific Gravity | 1.86 | 1.85 |
| Apparent Porosity (%) | 3.73 | 8.79 |
| Compressive Strength (kg/cm$^2$) | 210 | 178 |

EXAMPLE 2

15 parts of liquid furnace resin was added to 100 parts of natural graphite comprising 60 parts of graphite 5~0.5 mm in granular diameter and 40 parts of graphite less than 0.125 mm in granular diameter and kneaded by a kneader for 20 minutes. The mixture, after adding 3 parts of pulverized phenol resin thereto, was further kneaded for 10 minutes, and then granulated by a granulator into pellets 3 mm in diameter. The pellets thus obtained were treated at 60° C. for 20 hours and formed into bricks under the same conditions as in Example 1.

Table 2 shows the physical properties of the bricks thus obtained.

Table 2

|  | Treated at 300° C. | Treated at 300° C. and then at 1000° C. |
|---|---|---|
| Apparent Specific Gravity | 1.86 | 1.95 |
| Bulk Specific Gravity | 1.79 | 1.78 |
| Apparent Porosity (%) | 3.62 | 8.54 |
| Compressive Strength (kg/cm$^2$) | 204 | 173 |

EXAMPLE 3

10 parts of pulverized phenol resin was added to 100 parts of a mixture comprising 70 parts of natural graphite 5~0.5 mm in diameter and 30 parts of petroleum coke less than 0.125 mm in diameter and kneaded by a kneader for 10 minutes. The mixture, after adding 15 parts of liquid phenol resin thereto, was further kneaded for 20 minutes at room temperature. The mixture thus obtained was granulated by a granulator into pellets 2 mm in diameter, and the pellets were subjected to a heat treatment at 60° C. for 20 hours.

After cooling, 70 parts of the pellets and 30 parts of electrically fused alumina (3~1 mm) were kneaded by a kneader for 5 minutes and then pressed into bricks by a 300 $ friction press. The bricks thus obtained were subjected to a heat treatment in a baking furnace at 300° C. for 4 hours.

Table 3 shows the physical properties of the bricks thus obtained and those of the bricks subjected to a further heat treatment at 1000° C. in a reducing atmosphere.

Table 3

|  | Treated at 300° C. | Treated at 300° C. and then at 1000° C. |
|---|---|---|
| Apparent Specific Gravity | 2.31 | 2.80 |
| Bulk Specific Gravity | 2.22 | 2.26 |
| Apparent Porosity (%) | 4.02 | 19.2 |
| Compressive Strength (kg/cm$^2$) | 230 | 180 |

EXAMPLE 4

4 parts of fine-grained magnesium oxide less than 0.125 mm in granular diameter was added to 100 parts of natural graphite same as in Example 1 and kneaded by a kneader for 10 minutes. The mixture, after adding 15 parts of liquid phenol resin thereto, was kneaded for 20 minutes at room temperature, and then adding 5 parts of pulverized phenol resin thereto, was further kneaded for 5 minutes. The mixture thus obtained was granulated by a granulator into pellets 3 mm in diameter, and the pellets were left as they stood at room temperature (averaging about 20° C.) for 24 hours.

30 parts of magnesia clinker (5~1 mm) was added to 70 parts of the said pellets. The mixture, after kneading it by a kneader for 5 minutes, was pressed into bricks by a 300 $ friction press, and the bricks thus obtained were subjected to a heat treatment in a baking furnace at 300° C. for 4 hours.

Table 4 shows the physical properties of the bricks treated at 300° C. and those of the bricks further treated at 1000° C. for 3 hours in a reducing atmosphere.

Table 4

|  | Treated at 300° C. | Treated at 300° C. and then at 1000° C. |
|---|---|---|
| Apparent Specific Gravity | 2.42 | 2.52 |
| Bulk Specific Gravity | 2.35 | 2.31 |
| Apparent Porosity (%) | 2.80 | 8.80 |
| Compressive Strength (kg/cm$^2$) | 205 | 176 |

Bricks obtained by leaving the pellets described in Example 4 as they stood at room temperature (20° C.) for 10 days showed substantially same values of physical properties. Even when room temperature varied according to the change of seasons, the bricks were producible without problem by changing the adding amount of magnesium oxide.

EXAMPLE 5

100 parts of natural graphite same as in Example 1, 7 parts of fine-grained magnesium oxide less than 0.125 mm in granular diameter and =parts of pulverized phenol resin were mixed by a kneader for 10 minutes. The mixture, after adding 15 parts of liquid phenol resin thereto, was kneaded for 20 minutes at room temperature, and the mixture thus obtained was granulated by a granulator into pellets 3 mm in diameter, and the pellets were left as they stood at room temperature (20° C.) for 12 hours.

50 parts of the pellets, 30 parts of calcined anthracite (5~1 mm), 20 parts of electrically fused magnesia (5~1 mm) and 3 parts of liquid phenol resin were kneaded by a kneader for 20 minutes and pressed into bricks by a 300 $ friction press. The bricks thus obtained were subjected to a heat treatment in a baking furnace at 300° C. for 4 hours.

Table 5 shows the physical properties of said bricks and those of the bricks further treated at 1000° C. for 3 hours in a reducing atmosphere.

Table 5

|  | Treated at 300° C. | Treated at 300° C. and then at 1000° C. |
|---|---|---|
| Apparent Specific Gravity | 2.10 | 2.26 |
| Bulk Specific Gravity | 2.00 | 1.99 |
| Apparent Porosity (%) | 4.83 | 12.11 |
| Compressive Strength (kg/cm$^2$) | 225 | 170 |

Comparative Example 1

Lamination arose when bricks were formed by exactly the same method as in Example 1 except that the pellets obtained in Example 1 were not heat-treated.

Comparative Example 2

Bricks were obtained by exactly the same method as in Example 1 except that the pellets obtained in Example 1 were heat-treated at 120° C. for 30 minutes.

Table 6 shows the physical properties of bricks treated at 300° C. and those of bricks further treated at 1000° C. for 3 hours in a reducing atmosphere.

Table 6

|  | Treated at 300° C. | Treated at 300° C. and then at 1000° C. |
|---|---|---|
| Apparent Specific | 1.96 | 2.10 |

Table 6-continued

|  | Treated at 300° C. | Treated at 300° C. and then at 1000° C. |
| --- | --- | --- |
| Gravity |  |  |
| Bulk Specific Gravity | 1.86 | 1.82 |
| Apparent Porosity (%) | 5.02 | 13.14 |
| Compressive Strength (kg/cm$^2$) | 175 | 92 |

Examination of the bricks obtained by a heat treatment at 300° C. in Comparative Example 2 revealed that there were small cracks on each of the pellets. As a result, the apparent porosity showed a high percentage, whilst the compression strength showed a small value.

Comparative Example 3

Bricks were obtained by the same method as in Example 1 except that no pulverized phenol resin was added. Table 7 shows the physical properties of the bricks thus obtained.

Table 7

|  | Treated at 300° C. | Treated at 300° C. and then at 1000° C. |
| --- | --- | --- |
| Apparent Specific Gravity | 1.92 | 2.02 |
| Bulk Specific Gravity | 1.84 | 1.80 |
| Apparent Porosity (%) | 4.4 | 10.7 |
| Compressive Strength (kg/cm$^2$) | 120 | 102 |

Comparative Example 4

20 parts of tar was added to 100 parts of natural graphite comprising 60 parts of graphite 5~0.5 mm in granular diameter and 40 parts of graphite less than 0.125 mm in granular diameter and mixed by a kneader for 20 minutes. The mixture thus obtained was granulated by a granulator into pellets 3 mm in diameter and cooled to room temperature. 100 parts of the pellets were pressed into bricks by a 300 ⊤ friction press.

When the bricks thus formed were treated at 300° C., they were softened and deformed. Table 8 shows the physical properties of said bricks, in which the compression strength shows a small value.

Table 8

|  | Treated at 300° C. | Treated at 300° C. and then at 1000° C. |
| --- | --- | --- |
| Apparent Specific Gravity | 1.98 | Untestable due |
| Bulk Specific Gravity | 1.83 | to heavy |
| Apparent Porosity (%) | 7.82 | softening and |
| Compressive Strength (kg/cm$^2$) | 80 | deformation |

In each case of Examples 1 through 5, carbonaceous bricks of high density and low porosity were obtainable without growth of lamination at the time of brick-forming. No lamination arose even when inorganic refractory materials of carbides and nitrides were mixed with the pellets.

Carbonaceous bricks obtained by the methods of Examples 1 and 2 were applied to the periphery of the water cooling box of the electric steel furnace. The results were better than in the case of conventional magnesia carbon bricks containing 20 weight % of carbon or electrode carbon bricks.

What is claimed is:

1. Carbonaceous bricks containing 40~100 weight % of pellets consisting of carbonaceous material containing substantially more than 70 weight % of carbon and a bonding agent comprising pulverized phenol resin, liquid thermosetting resin and/or setting accelerator, the amount of carbon in the ultimately completed bricks being more than 40 weight %.

2. A method for producing carbonaceous bricks wherein pellets consisting of carbonaceous material containing substantially more than 70 weight % of carbon and a bonding agent comprising pulverized phenol resin, liquid thermosetting resin and/or setting accelerator, are treated at a temperature between room temperature and 100° C., subsequently less than 60 weight % of inorganic refractory material being mixed with 40~100 weight % of said heat-treated pellets whereby to form bricks, the amount of carbon contained in the finished bricks being more than 40 weight %.

3. A method for producing carbonaceous bricks as defined in claim 2 wherein the bonding agent comprises liquid thermosetting resin of phenol, urea, melamine, epoxy, furane, and pulverized phenol resin.

4. A method for producing carbonaceous bricks as defined in claim 2 wherein the bonding agent comprises liquid thermosetting resin, pulverized phenol resin and setting accelerator.

* * * * *